US011318901B2

(12) United States Patent
Gutierrez

(10) Patent No.: US 11,318,901 B2
(45) Date of Patent: May 3, 2022

(54) SKID PLATE ASSEMBLY

(71) Applicant: Lund Motion Products, Inc., Buford, GA (US)

(72) Inventor: Carlos Gutierrez, Norwalk, CA (US)

(73) Assignee: Lund Motion Products, Inc., Buford, GA (US)

( * ) Notice: Subject to any disclaimer, the term of this patent is extended or adjusted under 35 U.S.C. 154(b) by 290 days.

(21) Appl. No.: 16/593,047

(22) Filed: Oct. 4, 2019

(65) Prior Publication Data

US 2020/0130620 A1    Apr. 30, 2020

Related U.S. Application Data

(60) Provisional application No. 62/804,948, filed on Feb. 13, 2019, provisional application No. 62/793,581, filed on Jan. 17, 2019, provisional application No. 62/751,465, filed on Oct. 26, 2018.

(51) Int. Cl.
*B60R 19/50* (2006.01)
*B62D 65/16* (2006.01)
*B60Q 1/18* (2006.01)
*B60Q 1/04* (2006.01)

(52) U.S. Cl.
CPC ............ *B60R 19/50* (2013.01); *B60Q 1/0408* (2013.01); *B60Q 1/18* (2013.01); *B62D 65/16* (2013.01)

(58) Field of Classification Search
CPC ... B60R 2019/505; B60R 19/50; B60R 19/44; B60R 19/48; B60R 19/52; B60R 19/54; B62D 21/155; B62D 21/2072; B60Q 1/18; B60Q 1/0483

USPC ........................................................ 293/117
See application file for complete search history.

(56) References Cited

U.S. PATENT DOCUMENTS

| 1,674,340 | A | 6/1928 | Nock |
| 2,120,619 | A | 6/1938 | Matthiesen |
| 3,451,035 | A | 6/1969 | Baldwin |
| 3,474,381 | A | 10/1969 | Baldwin |
| 5,306,156 | A | 4/1994 | Gibbs et al. |
| 5,599,086 | A | 2/1997 | Dutta |
| 7,097,225 | B2 | 8/2006 | Huisingh et al. |
| 7,460,187 | B2 | 12/2008 | Schedivy |
| 7,674,010 | B2 | 3/2010 | Griffiths et al. |
| 9,923,341 | B1 | 3/2018 | Andersson et al. |
| D845,244 | S | 4/2019 | Andersson et al. |
| 2002/0179353 | A1* | 12/2002 | Robinson ........... B62D 25/2072 180/69.1 |
| 2008/0148515 | A1 | 6/2008 | Petelka |
| 2008/0273342 | A1 | 11/2008 | Kim |
| 2010/0102579 | A1* | 4/2010 | Hardy ..................... B60R 19/48 293/106 |

(Continued)

*Primary Examiner* — Gregory A Blankenship
(74) *Attorney, Agent, or Firm* — Knobbe, Martens, Olson & Bear LLP

(57) ABSTRACT

Disclosed herein are embodiments of a vehicle that can include a bumper, a plurality of frame brackets, and a skid plate assembly, and related methods. Also disclosed herein are embodiments of a skid plate assembly that can include a light source and a main body with a first portion, a second portion, and a plurality of mounts. The skid plate assembly can extend below a bumper of a vehicle. The main body can define an opening that exposes the light source and the face of the light source can be aimed forward and downward.

20 Claims, 13 Drawing Sheets

(56) References Cited

U.S. PATENT DOCUMENTS

| | | | |
|---|---|---|---|
| 2012/0144648 A1* | 6/2012 | Iwamoto | B60R 19/48 |
| | | | 29/428 |
| 2018/0118142 A1* | 5/2018 | Wymore | B60R 19/50 |
| 2018/0361909 A1* | 12/2018 | Chen | B60Q 1/2626 |
| 2019/0126809 A1* | 5/2019 | Wymore | B60R 19/50 |
| 2019/0126868 A1* | 5/2019 | Wymore | B60R 19/44 |
| 2019/0337476 A1* | 11/2019 | Hare | B60R 19/48 |
| 2020/0070895 A1* | 3/2020 | Greggs | B62D 21/02 |
| 2020/0130620 A1* | 4/2020 | Gutierrez | B62D 65/16 |
| 2020/0361543 A1* | 11/2020 | Grattan | B62D 25/2018 |
| 2021/0024023 A1* | 1/2021 | Shenaq | B60R 21/34 |
| 2021/0024141 A1* | 1/2021 | Salter | H03K 17/955 |
| 2021/0129783 A1* | 5/2021 | Wymore | B60R 19/50 |
| 2021/0163069 A1* | 6/2021 | Williams | B62D 21/15 |

\* cited by examiner

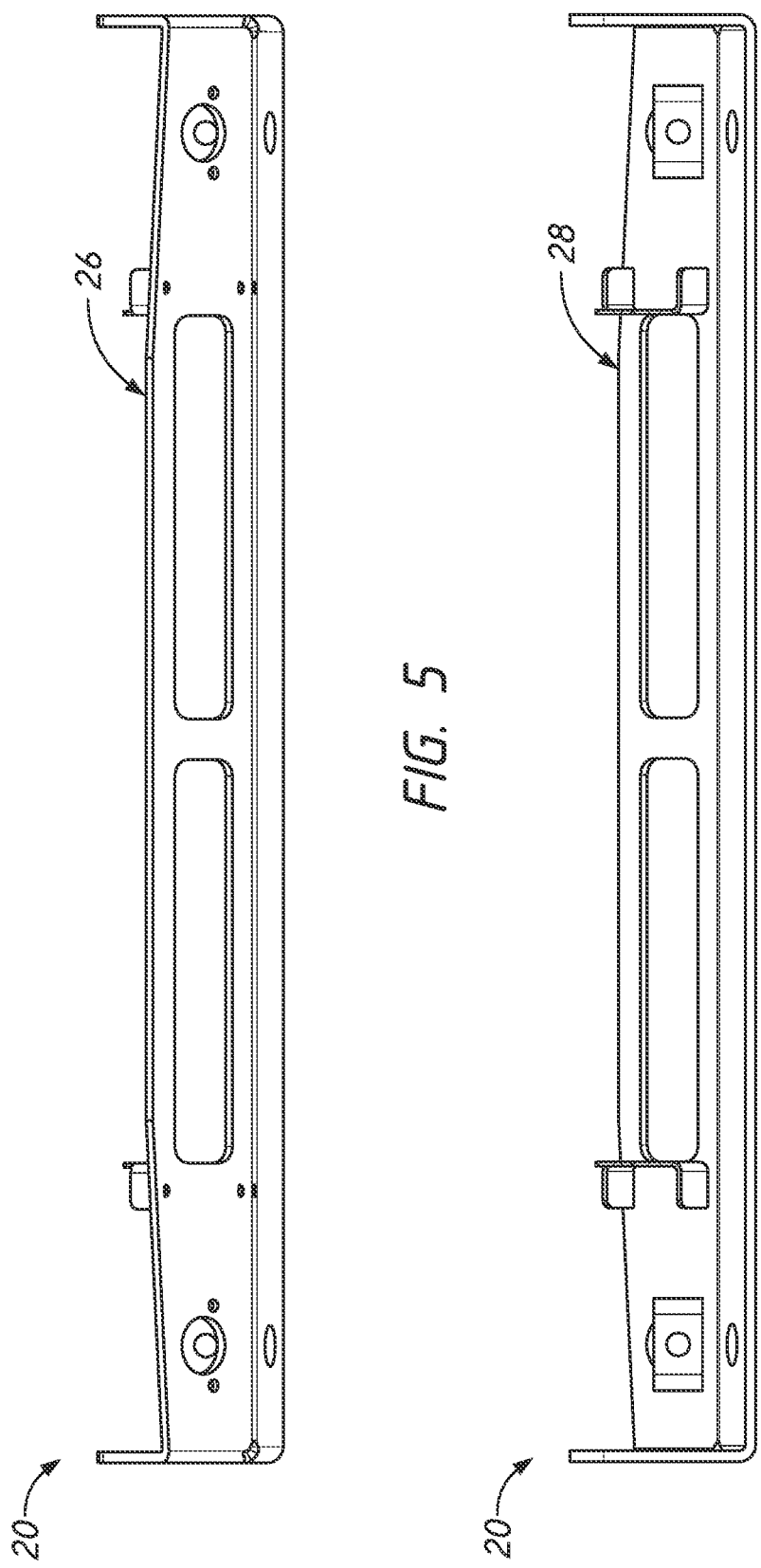

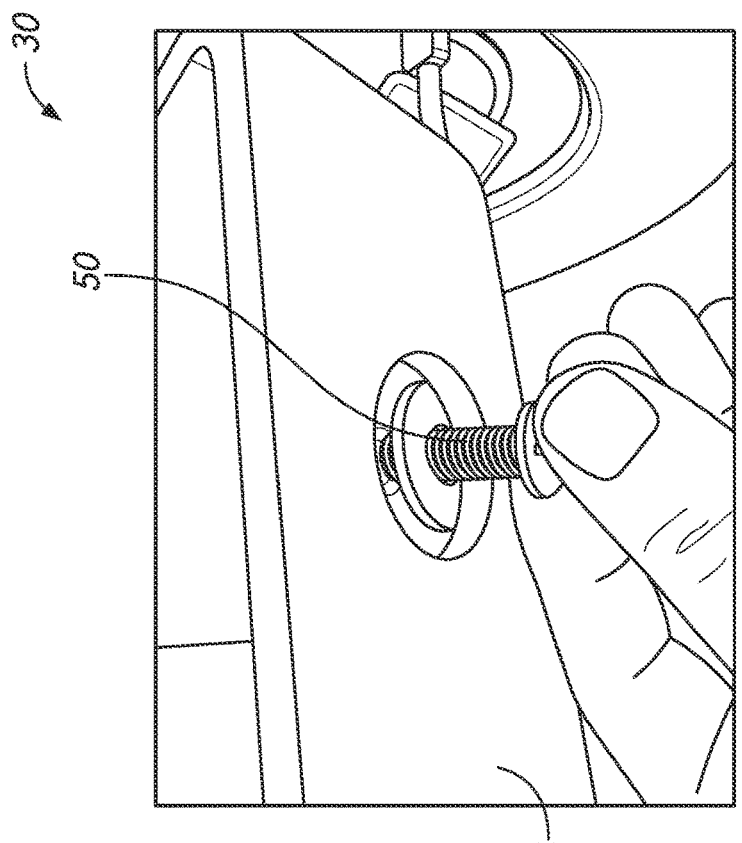
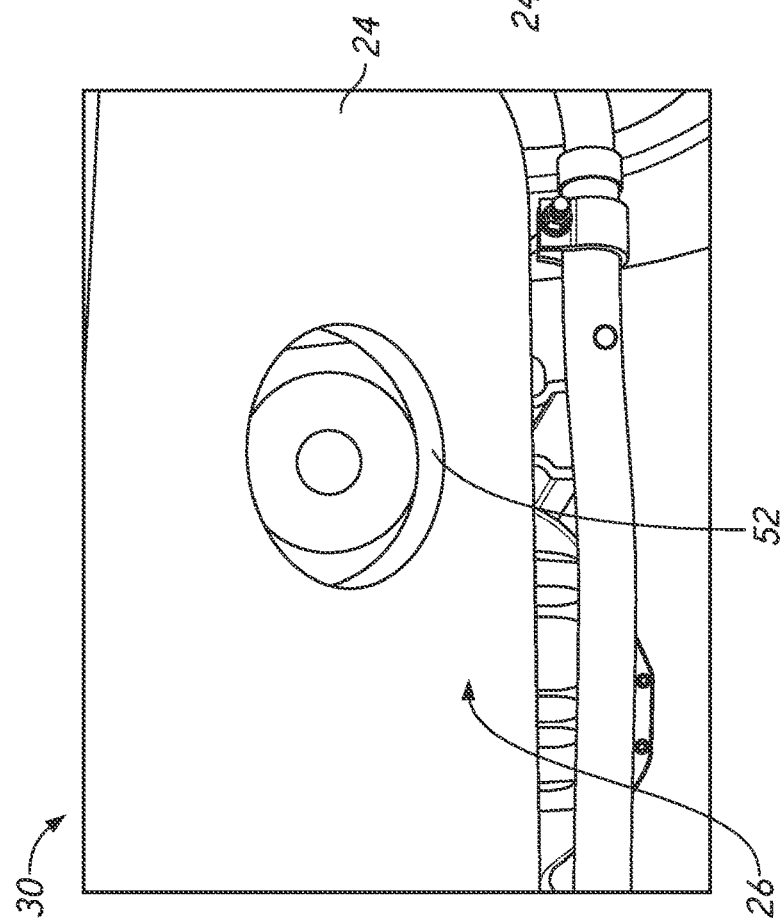

SKID PLATE ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to skid plate assemblies and related methods.

Description of the Related Art

Skid plate assemblies are configured for protecting vehicle components on an underside of a vehicle.

SUMMARY

Disclosed herein are embodiments of a vehicle comprising a bumper, a plurality of frame brackets, a skid plate assembly coupled to the frame brackets, the skid plate assembly comprising a main body having a first portion, a second portion, a front surface, a rear surface, and a plurality of mounts, a light source having a first end, a second end, and a face through which light is directed, wherein the skid plate assembly extends below the bumper, wherein the front surface of the main body defines an opening that exposes the light source, and wherein when the vehicle is on a horizontal surface, the face of the light source is aimed forward and downward at a first angle of 60 degrees or less from horizontal.

In some embodiments, when the vehicle is on a horizontal surface, the face of the light source is aimed forward and downward at an angle of at least 30 degrees relative to a plane that is perpendicular to the horizontal surface. The angle can be between 30 and 75 degrees relative to the plane. The angle can be adjustable.

In some embodiments, the first and second portions of the main body can be planar surfaces. In some embodiments, the first portion can extend along an underside of the vehicle to protect a plurality of vehicle components from impact. In some embodiments, the second portion can extend forward and upward relative to the first portion.

In some embodiments, the assembly can include a light mount. In some embodiments, the light mount can include at least one of: (1) a first flange and a second flange extending rearward from the rear surface of the main body and configured to secure the first and second ends of the light source, (2) a top flange and a bottom flange extending rearward from the rear surface of the main body and configured to secure the light source to the main body, (3) a back face spaced rearward from the rear surface of the main body, and (4) a plurality of holes extending from the rear surface to the front surface of the main body and configured to receive a plurality of fasteners to secure the light source to the main body.

In some embodiments, the assembly can include a plurality of fasteners. In some embodiments, the fasteners can extend through a plurality of apertures in the mounts and into the frame brackets.

In some embodiments, the mounts can include at least one of: (1) a first arm and a second arm configured to attach to a first and second lateral side of the frame brackets; and (2) a first support and a second support extending rearward from the rear surface of the main body and configured to attach to a first and second front surface of the frame brackets.

In some embodiments, the face of the light source can be recessed from the front surface of the second portion.

In some embodiments, the assembly can include a power assembly. In some embodiments, the assembly can include a wiring harness.

In some embodiments, the first angle of the light source can be between 30 and 75 degrees relative to the plane.

In some embodiments, the bumper can be a separate component from the skid plate assembly. In some embodiments, the skid plate assembly can be integral with the bumper. In some embodiments, the frame brackets can be integral with the bumper.

In some embodiments, a second angle between the first portion and the second portion of the main body can be at least 120 degrees.

In some embodiments, an orientation of the light source can be adjusted with respect to the main body.

In some embodiments, the first angle can be adjusted.

Also disclosed herein are embodiments of a method for installing a skid plate assembly on a vehicle, the method comprising providing a skid plate assembly, the skid plate assembly comprising a main body having a plurality of mounts and a light source having a first end, a second end, and a face through which light is directed, attaching the skid plate assembly to a vehicle such that the skid plate assembly extends below a vehicle bumper, and aiming the face of the light source forward and downward at an angle of 60 degrees or less from horizontal when the vehicle is on a horizontal surface.

In some embodiments, when the vehicle is on a horizontal surface, the face of the light source is aimed forward and downward at an angle of at least 30 degrees relative to a plane that is perpendicular to the horizontal surface.

In some embodiments, attaching the skid plate assembly to the vehicle can include extending a fastener through an aperture in at least one of the plurality of mounts of the main body and into a pre-existing groove in a frame bracket on the vehicle without drilling. In some embodiments, the fastener can slide along the pre-existing groove of the frame bracket to a location before securing the fastener.

In some embodiments, the angle of the face of the light source can be adjusted relative to horizontal by pivoting the light source.

BRIEF DESCRIPTION OF THE DRAWINGS

These and other features and advantages of the present devices, systems, and methods will become appreciated as the same becomes better understood with reference to the specification, claims and appended drawings wherein:

FIGS. 2-7 show embodiments of a main body of the skid plate assembly;

FIGS. 13, 14A, and 14B show an embodiment of the skid plate assembly being coupled to the frame bracket;

DETAILED DESCRIPTION

The detailed description set forth below in connection with the appended drawings is intended as a description of the presently preferred embodiments of skid plate assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
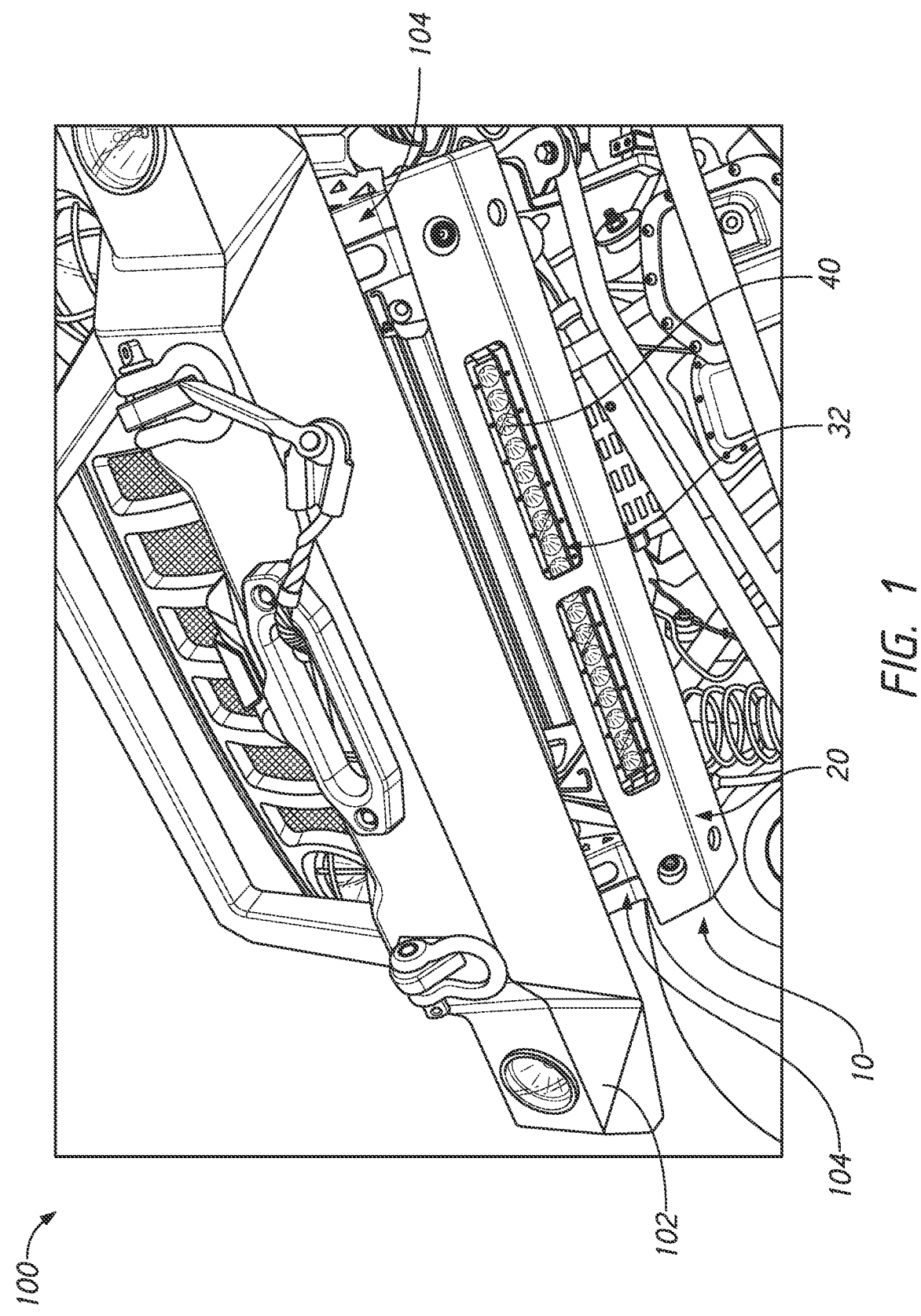
FIG. 1 shows an embodiment of a skid plate assembly assembled on a vehicle.

FIG. 1 illustrates an embodiment of a vehicle 100 that is compatible with a skid plate assembly 10, such as a Jeep Wrangler. The vehicle 100 can be a jeep, truck, etc. In some embodiments, the vehicle 100 can include an aerodynamic panel. The aerodynamic panel can be a plastic plate. The vehicle 100 can include a bumper 102 and a plurality of frame brackets 104. The frame brackets 104 can be integral with the bumper 102 and/or separate components. The skid plate assembly 10 can be attached to the vehicle 100 such that the skid plate assembly 10 extends below the bumper 102. The skid plate assembly 10 can be integral with the bumper 102 and/or a separate assembly. The skid plate assembly 10 can be made of durable materials such as steel. The skid plate assembly 10 can include a black powder-coated finish.

Figure 2:
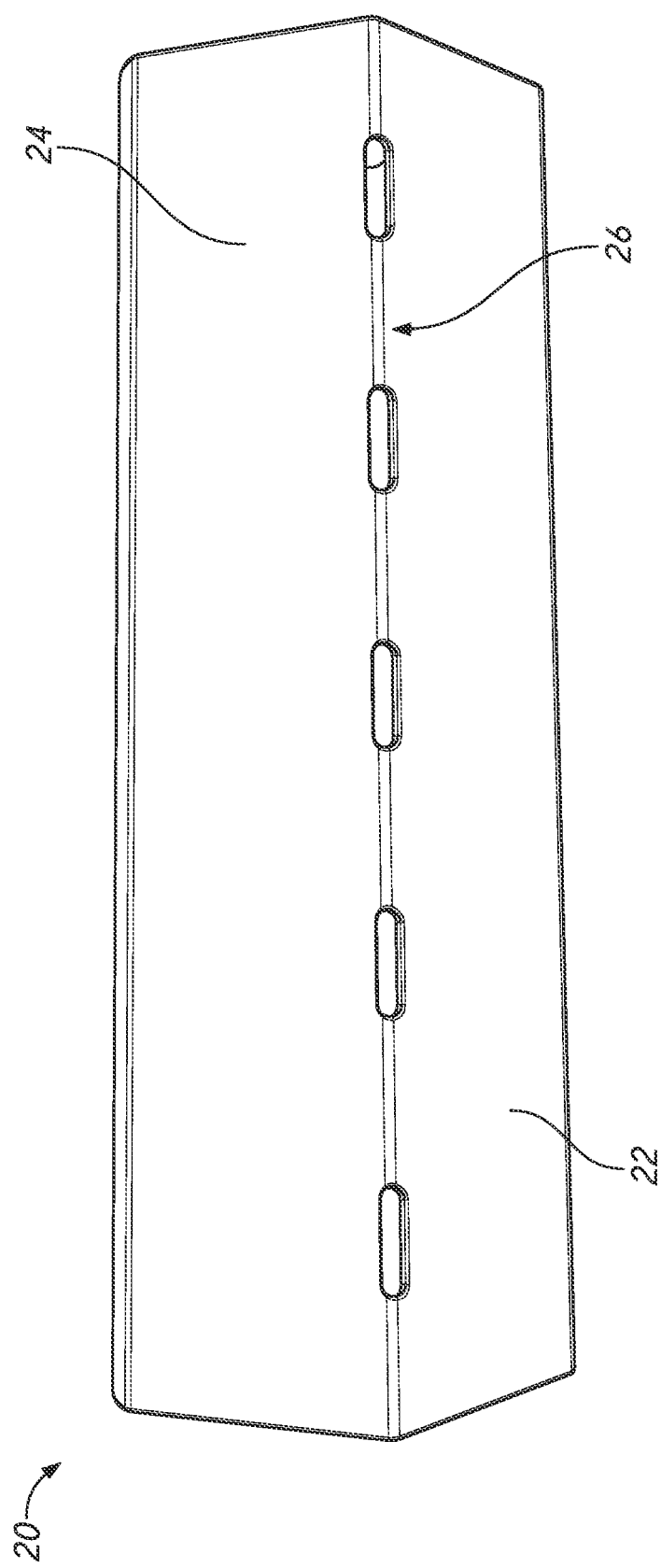

In some embodiments, the skid plate assembly 10 can include a light source 40. This advantageously provides the driver with better visibility of the ground in front of and/or beneath the vehicle 100. In certain other embodiments, as shown in FIG. 2, the skid plate assembly 10 can have a main body 20 without an opening 32 for a light source 40. In some embodiments, including the illustrated embodiment, the skid plate assembly 10 can include a main body 20 with a first portion 22, a second portion 24, a front surface 26, and a rear surface 28. As illustrated, the first and second portions 22, 24 can be planar surfaces. The first portion 22 can extend beneath an underside of a vehicle, such as an undercarriage of the vehicle 100. In some embodiments, the main body 20 can desirably include a rear mount configured to couple a rearward portion of the main body 20, such as a rearward segment of the first portion 22, to a rear portion of the vehicle 100. For example, the segment of the first portion 22 that extends beneath the vehicle can be bolted to the vehicle's frame. This can advantageously protect components of the vehicle 100 that may be vulnerable or exposed to elements while driving. The skid plate assembly 10 can reduce the amount of matter, such as dirt or debris, that contacts or collects under the vehicle 100 and can protect components of the vehicle 100 from impact. In some embodiments, the first portion 22 can extend beneath the vehicle 100 to desirably protect an axle of the vehicle 100 from impact. The second portion 24 can extend forward and upward relative to the first portion 22 such that at least a portion of the front surface 26 of the main body 20 is angled towards the ground beneath the vehicle 100.

In some embodiments, including the illustrated embodiment, the body 20 can include a plurality of mounts 30, such as arms, supports, etc. As shown in FIGS. 3, 8, 9, and 13, the mounts 30 can include a first arm and a second arm configured to attach to a first and a second lateral side 106 of the frame brackets 104. As shown in FIGS. 3, 8, 14A, and 14B, the mounts 30 can include a first support and a second support extending rearward from the rear surface 28 of the main body 20 and configured to attach to a first and second front surface 105 of the frame brackets 104. In some embodiments, including the illustrated embodiment, mounts 30 can include both arms and supports coupled to lateral sides 106 and/or front surfaces 105 of the frame brackets 104. This is advantageous because it can enhance the stability and durability of the skid plate assembly 10 when the vehicle is moving, such as when the vehicle is used for off-roading.

The mounts 30 can include a plurality of apertures 52 that are configured to receive a plurality of fasteners 50, such as bolts, screws, etc. The fasteners 50 can extend through the apertures 52 in the mounts 30 and into the frame brackets 104. The fasteners 50 can extend into pre-existing holes in the frame brackets 104. This is advantageous because it allows the skid plate assembly 10 to be easily attached to, such as bolted on to, the vehicle 100 without requiring drilling. The skid plate assembly 10 can be bolted to the frame brackets 104 in different positions. For example, the pre-existing holes in the frame brackets 104 can be grooves configured to cooperate with the fasteners 50. In some embodiments, the fasteners 50 are movable or slidable within the pre-existing holes in the frame brackets 104 prior to the fasteners 50 being secured. This can advantageously allow for the skid plate assembly 10 to be positioned in multiple configurations.

Figure 11A:
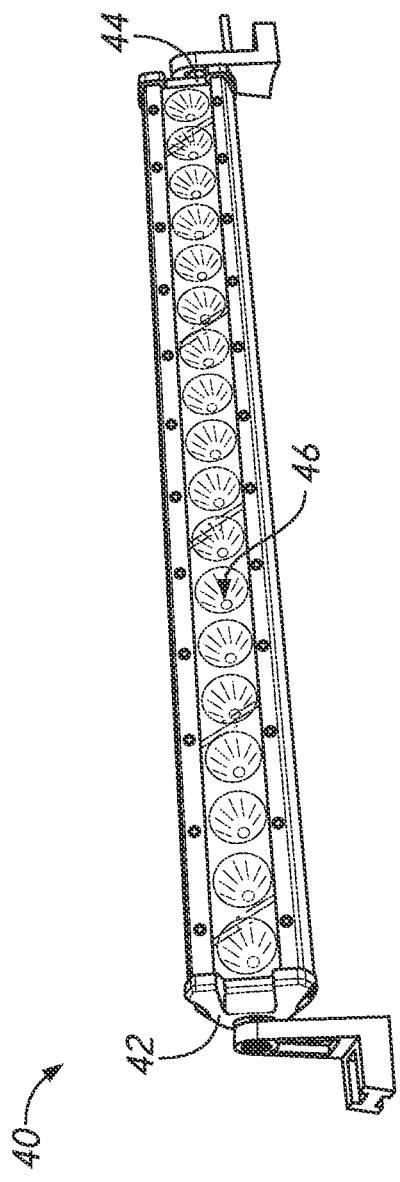
FIGS. 11A and 11B show embodiments of a light source.
Figure 11B:
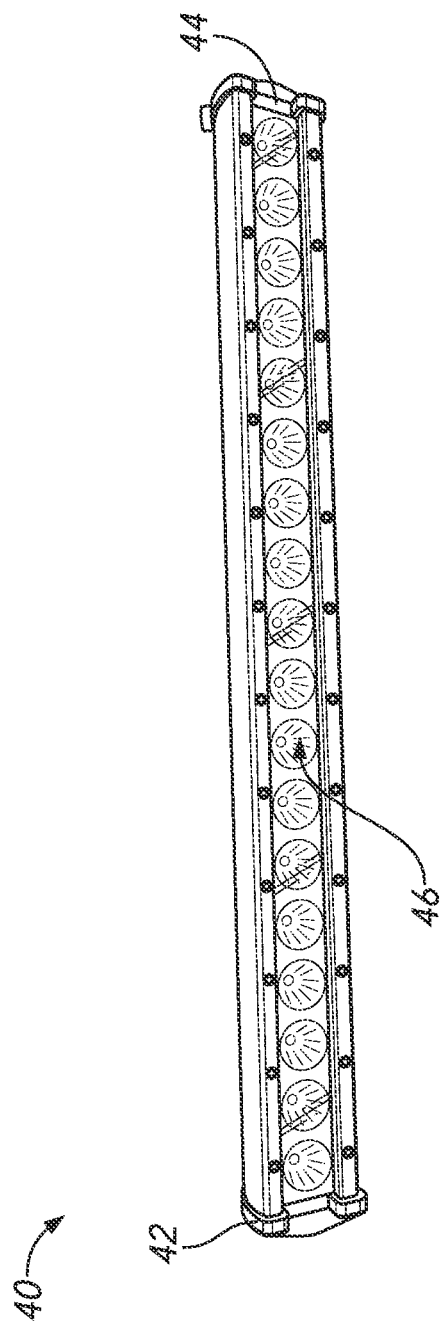

In some embodiments, the skid plate assembly 10 can include a light source 40. The light source 40 can be an LED. In some embodiments, the light source 40 can be operated, such as turned on, without the vehicle ignition key. As shown in FIGS. 11A and 11B, the light source 40 can have a first end 42, a second end 44, and a face 46.

In some embodiments, including the illustrated embodiment, the light source 40 can be protected. As shown in FIGS. 3-6, the front surface 26 of the main body 20 can define an opening 32 for exposing the light source 40. The face 46 of the light source 40 can be recessed from the front surface 26 of the second portion 24. In some embodiments, the opening 32 can be disposed on the second portion 24 of the body 20. The face 46 of the light source 40 can be aimed or directed forward and downward at a first angle A towards the ground. The first angle A can be at least 30 degrees relative to a plane that is perpendicular to the ground when the vehicle 100 is on a horizontal surface. The first angle A can be at least 45 degrees. The first angle A can be between 20 and 75 degrees. The first angle A can be between 40 and 60 degrees. The first angle A can be adjustable with respect to the plane. One of ordinary skill in the art would appreciate that when the vehicle 100 is on a horizontal surface and the face 46 of the light source 40 is aimed forward and downward at a first angle A of at least 30 degrees relative to the plane (see FIG. 7), the face 46 is at an angle of 60 degrees or less from horizontal.

Figure 7:
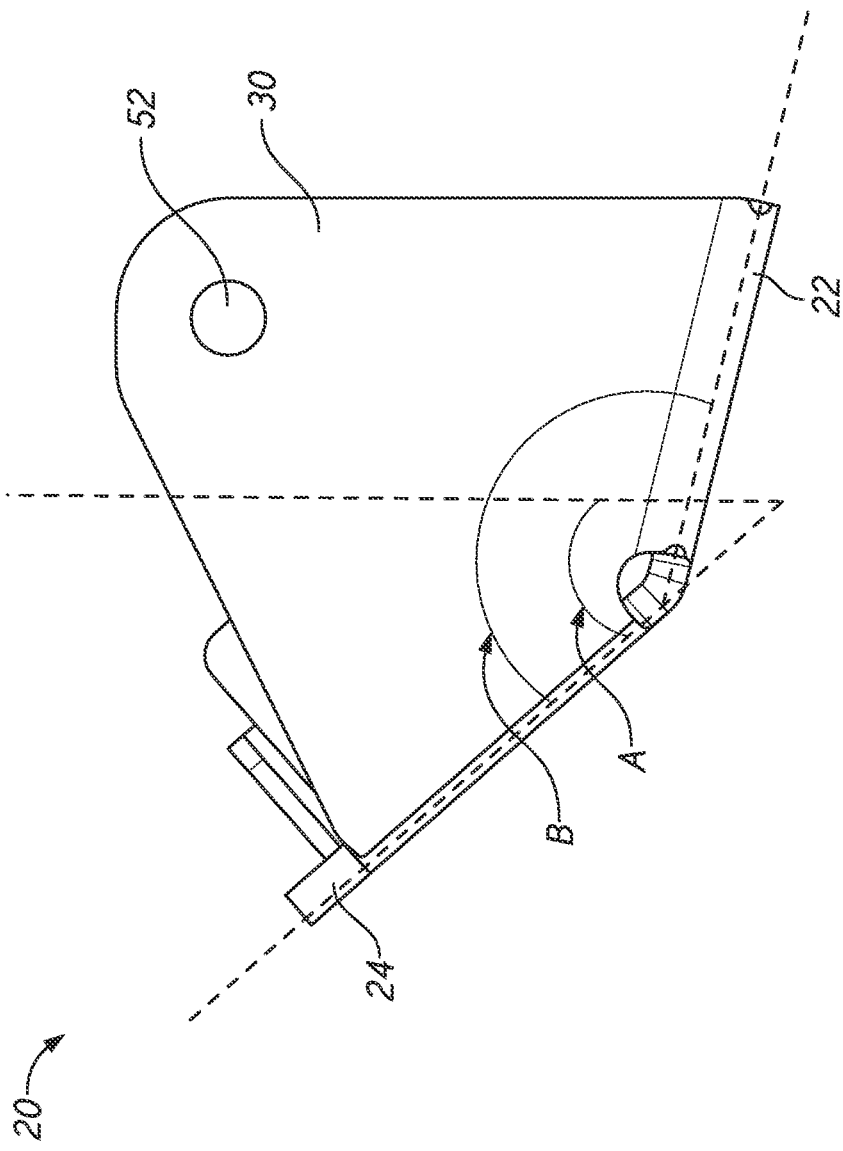
Figure 8:
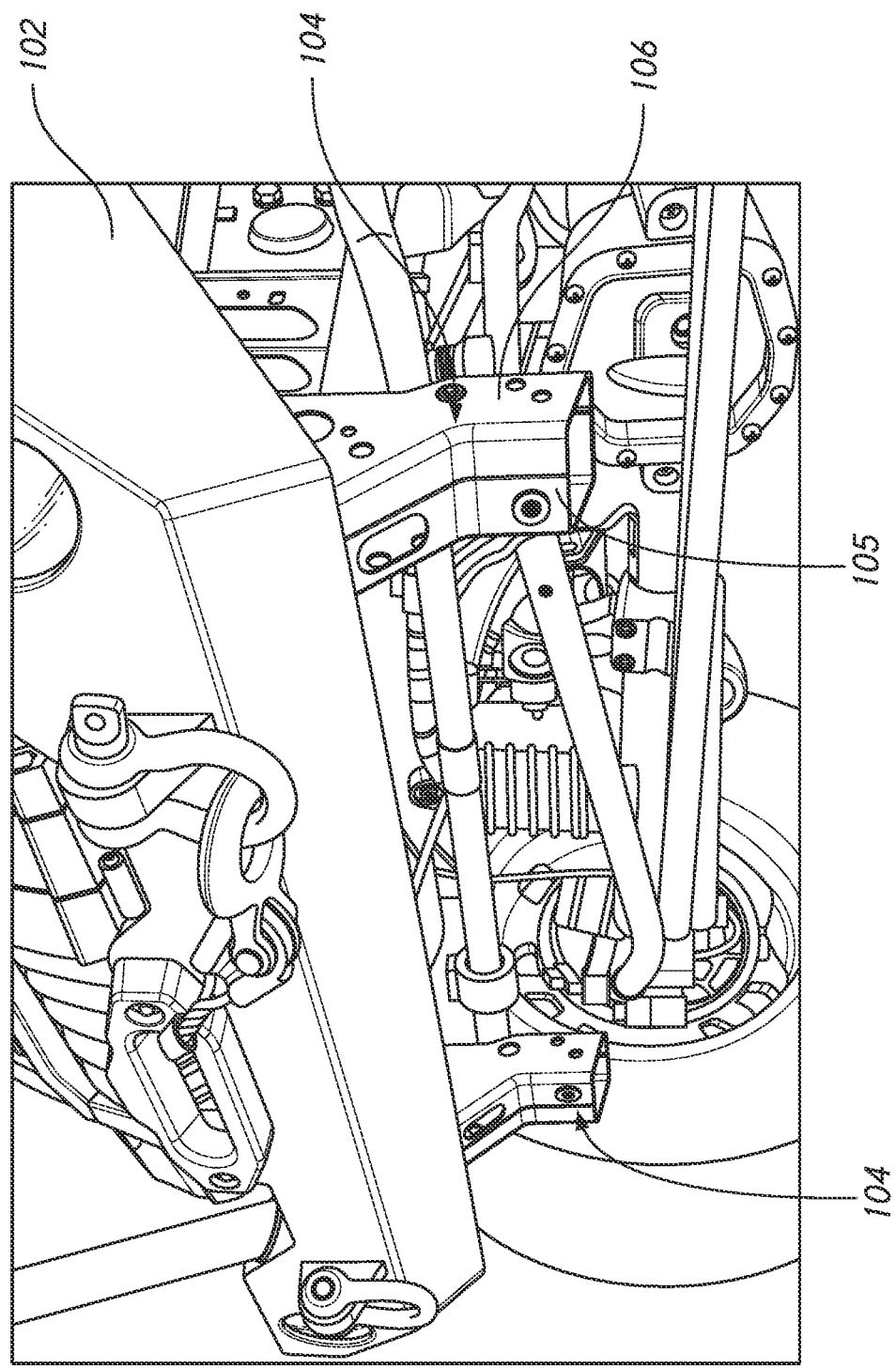
FIG. 8 shows an embodiment of a vehicle with frame brackets.
Figure 10:
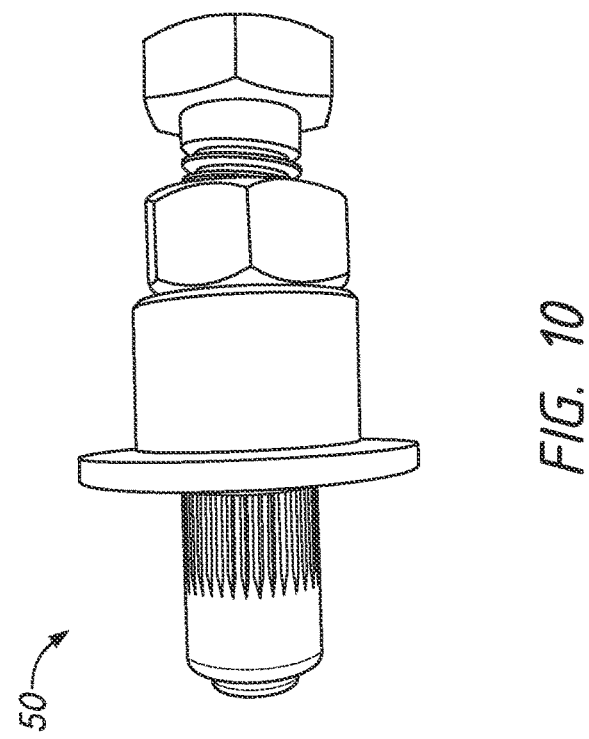
FIG. 10 shows an embodiment of a fastener.
Figure 9:
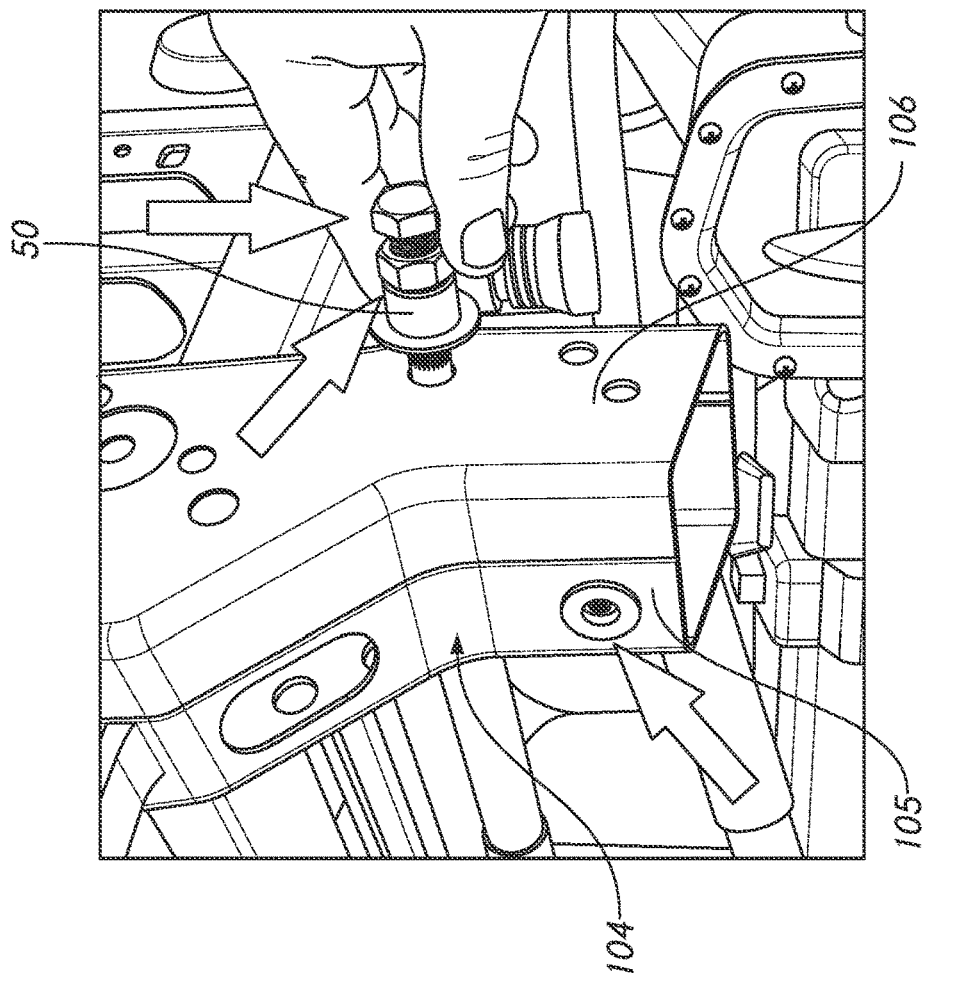
FIG. 9 shows an embodiment of a frame bracket.

As shown in FIG. 7, in some embodiments, the first portion 22 and the second portion 24 define a second angle B. In some embodiments, the second angle B between the first portion 22 and the second portion 24 of the main body 20 is at least 120 degrees. The second angle B can be between 90 and 170 degrees. The second angle B can be at least 150 degrees. The second angle B can be between 140 and 160 degrees. The second angle B can be adjustable.

Figure 3:
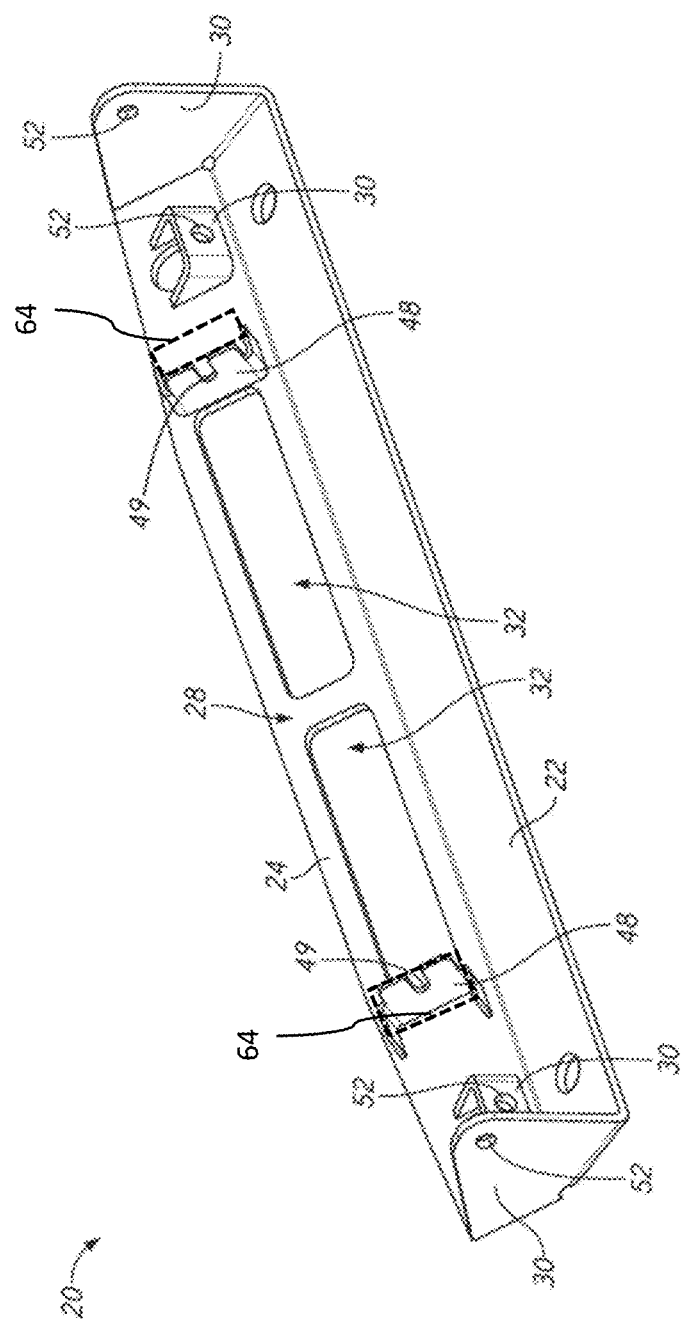
Figure 4:
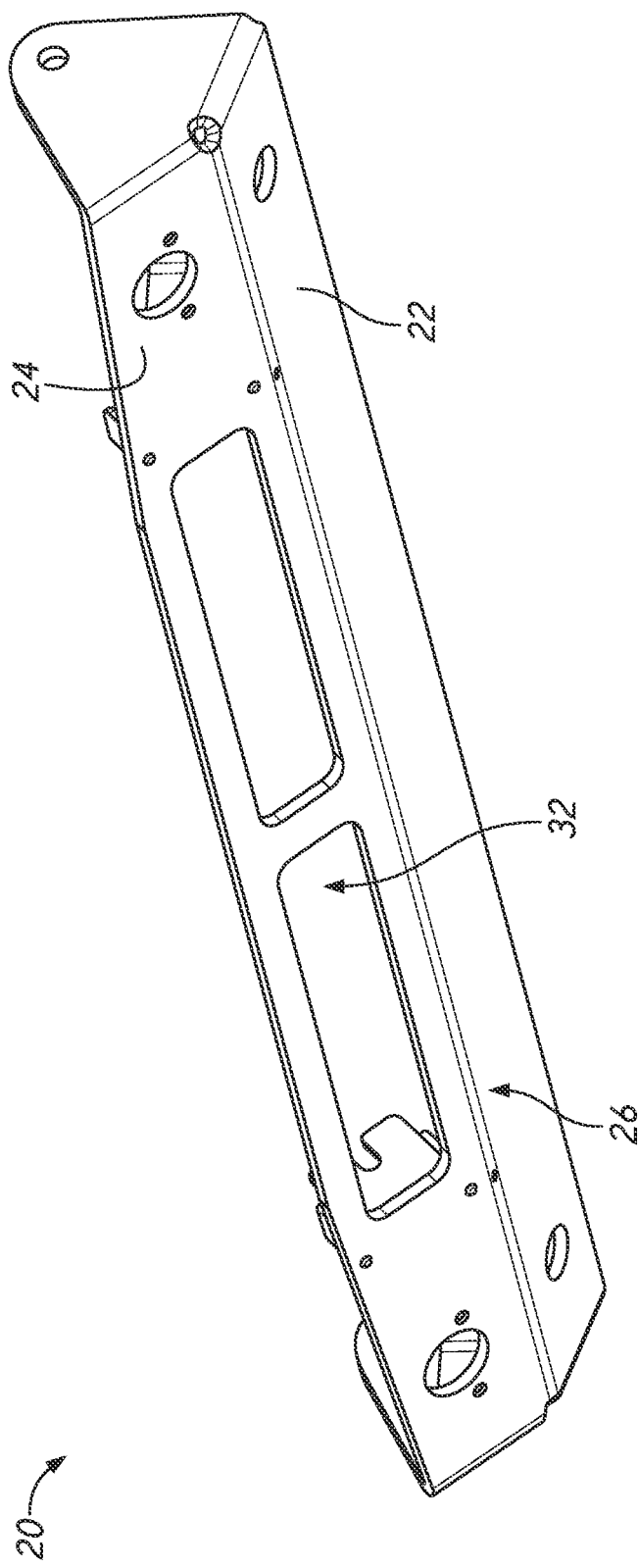
Figure 12:
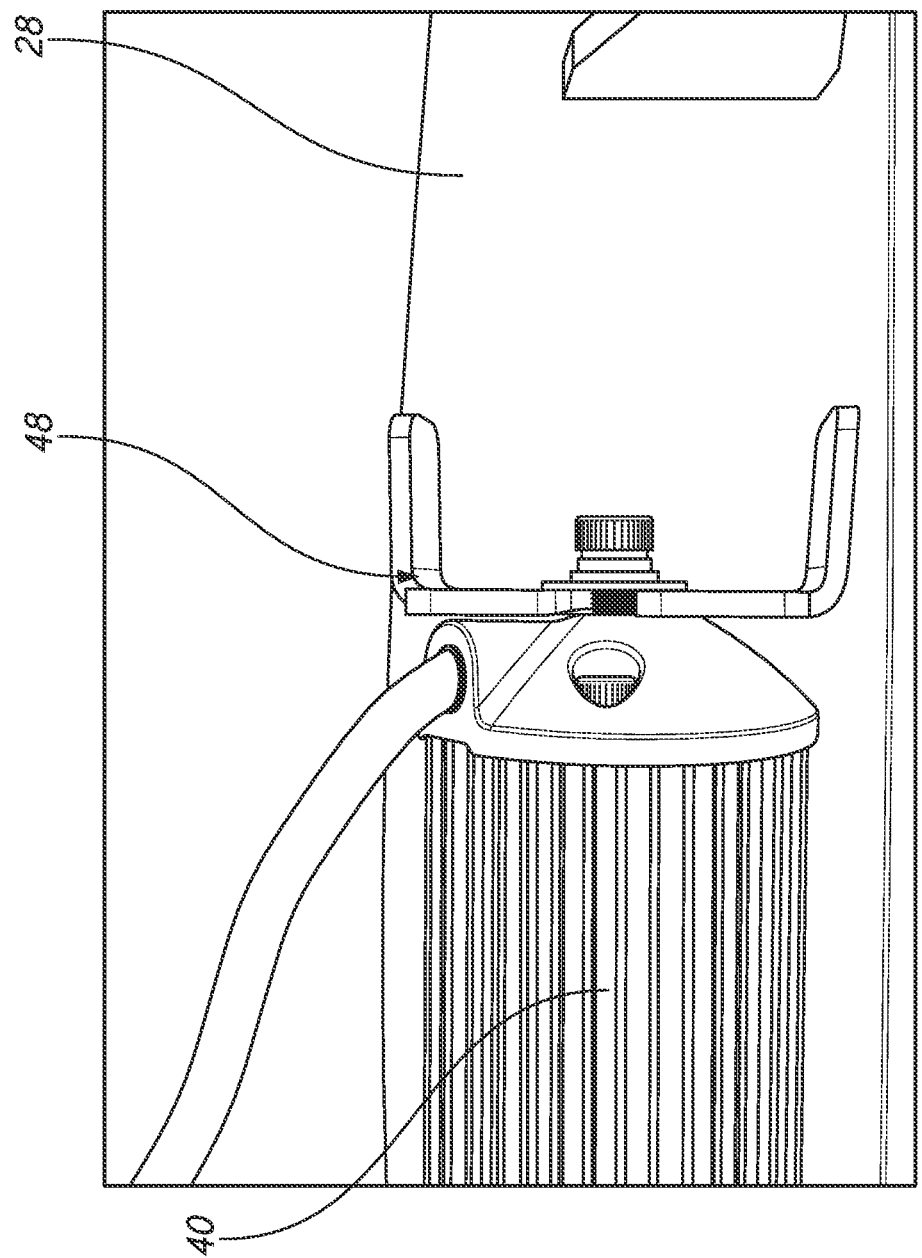
FIG. 12 shows an embodiment of a mount for the light source.
Figure 13:
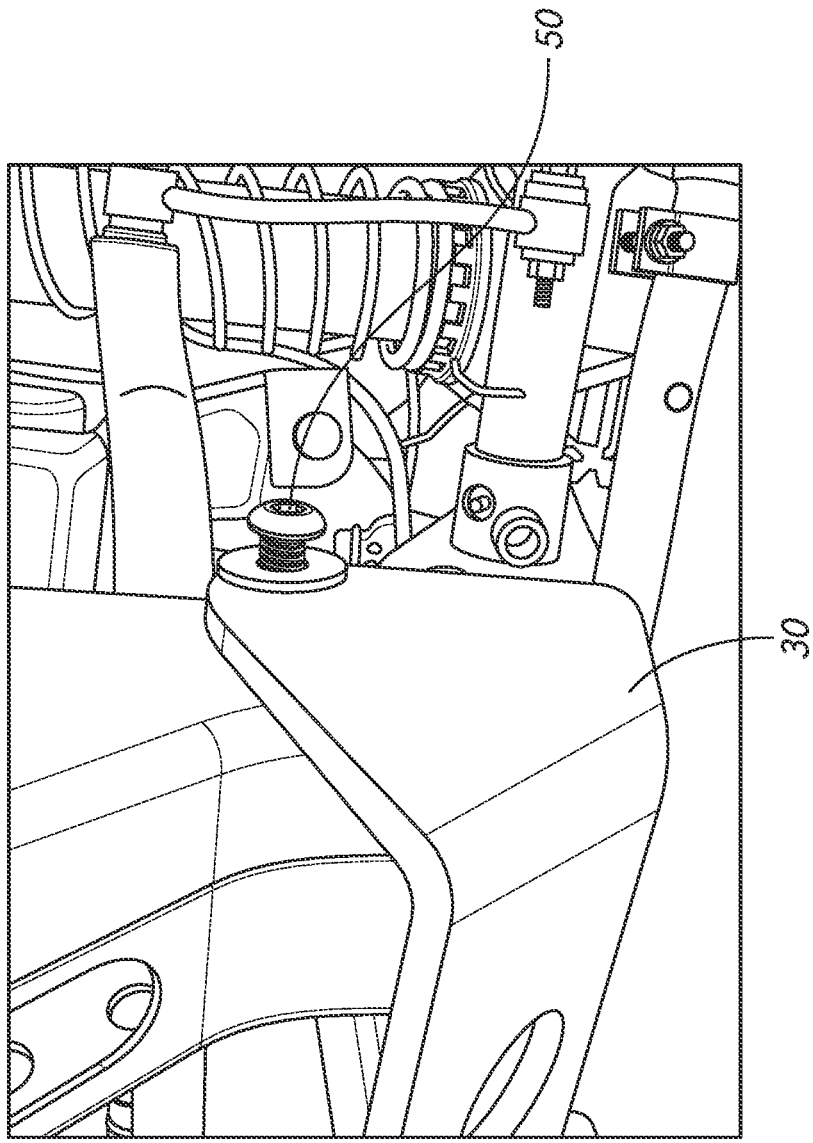

As illustrated in FIGS. 3, 6, and 12, the light source 40 can be mounted to the main body 20. For example, the skid plate assembly 10 can include a light mount 48. In some embodiments, including the illustrated embodiment, the light mount 48 can include a first flange and a second flange extending rearward from the rear surface 28 of the main body 20 and configured to secure the first and second ends 42, 44 of the light source 40. As shown in FIG. 3, the light mount 48 can include recesses 49, which can support the first and second ends 42, 44 of the light source 40. In some embodiments, the light mount 48 can include a top flange and a bottom flange extending rearward from the rear surface 28 of the main body 20 and configured to secure the light source 40 to the main body 20. In some embodiments, the light mount 48 can include a back face 64 spaced rearward from the rear surface 28 of the main body 20, as shown in phantom line in FIG. 3. In some embodiments, the light mount 48 can include a plurality of holes extending from the rear surface 28 to the front surface 26 of the main body 20 and configured to receive a plurality of fasteners to secure the light source 40 to the main body 20.

In some embodiments, the position and/or orientation of the light source 40 can be adjustable (e.g., the light source 40 can be aimed at different angles) with respect to the main body 20. For example, the recesses 49 in the light mount 48 can be grooves configured to cooperate with the first and second ends 42, 44 of the light source 40. In some embodiments, the first and second ends 42, 44 of the light source 40 are movable or slidable within the recesses 49 prior to the first and second ends 42, 44 being secured, enabling the light source 40 to be pivotable and the angle of the light source 40 to be selected by the user. This can advantageously allow the skid plate assembly 10 to provide surface lighting suited for and adapted to different driving conditions or environments.

Figure 15:
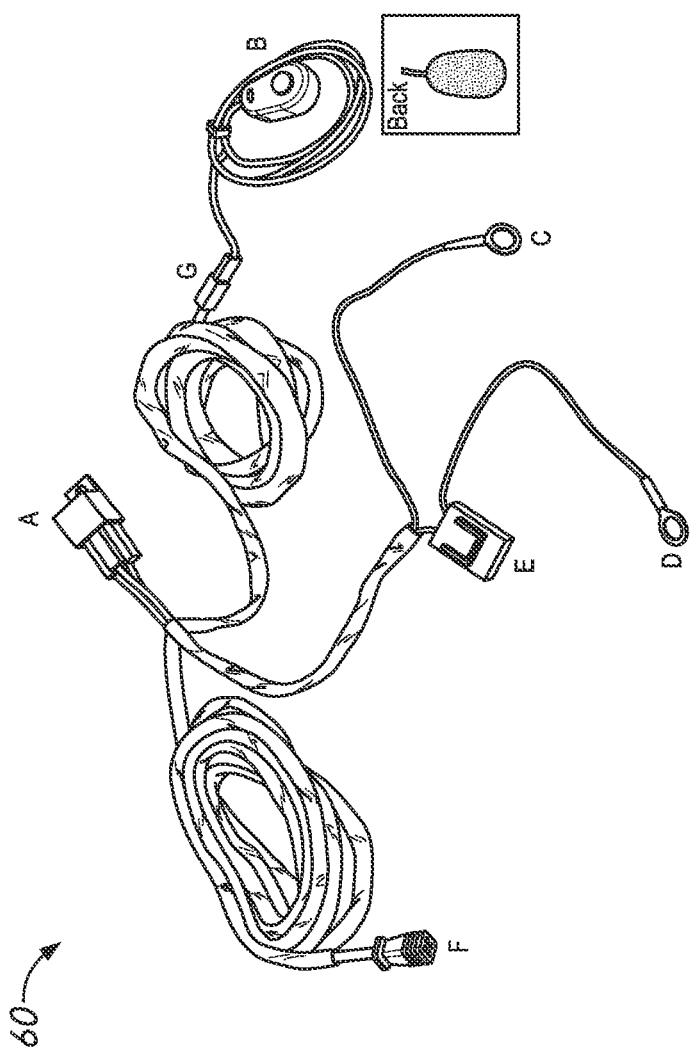
FIG. 15 illustrates an embodiment of a power assembly.

In some embodiments, the skid plate assembly 10 can include a power assembly 60. As shown in FIG. 15, the power assembly 60 can include a relay, switch, ground lead, power lead, fuse, connector, and/or power connector. In some embodiments, the skid plate assembly 10 can include a wiring harness. This can advantageously allow the components of the power assembly 60, such as wires, to be secured and routed to avoid contact with potentially hot or moving parts.

From the foregoing description, it will be appreciated that inventive skid plate assemblies and related methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations and/or "some embodiments" can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A vehicle comprising:
   a bumper;
   a plurality of frame brackets;
   a skid plate assembly coupled to the frame brackets, the skid plate assembly comprising:
      a main body having a first portion, a second portion, a front surface, a rear surface, and a plurality of mounts;
      a light source having a first end, a second end, and a face through which light is directed; and
      a light mount comprising at least one of:
         (1) a first flange and a second flange extending rearward from the rear surface of the main body and configured to secure the first and second ends of the light source;
         (2) a top flange and a bottom flange extending rearward from the rear surface of the main body and configured to secure the light source to the main body;
         (3) a back face spaced rearward from the rear surface of the main body; and
         (4) a plurality of holes extending from the rear surface to the front surface of the main body and configured to receive a plurality of fasteners to secure the light source to the main body;
   wherein the skid plate assembly extends below the bumper;
   wherein the front surface of the main body defines an opening that exposes the light source; and
   wherein when the vehicle is on a horizontal surface, the face of the light source is aimed forward and downward at a first angle of 60 degrees or less from horizontal.

2. The vehicle of claim 1, wherein the first and second portions of the main body are planar surfaces.

3. The vehicle of claim 1, wherein the first portion extends along an underside of the vehicle to protect a plurality of vehicle components from impact.

4. The vehicle of claim 1, wherein the second portion extends forward and upward relative to the first portion.

5. The vehicle of claim 1, further comprising a plurality of fasteners, wherein the fasteners extend through a plurality of apertures in the mounts and into the frame brackets.

6. The vehicle of claim 1, wherein the mounts comprise at least one of:
   (1) a first arm and a second arm configured to attach to a first and second lateral side of the frame brackets; and
   (2) a first support and a second support extending rearward from the rear surface of the main body and configured to attach to a first and second front surface of the frame brackets.

7. The vehicle of claim 1, wherein the face of the light source is recessed from the front surface of the second portion.

8. The vehicle of claim 1, further comprising a power assembly and a wiring harness.

9. The vehicle of claim 1, wherein the first angle of the light source is between 15 and 60 degrees relative to horizontal.

10. The vehicle of claim 1, wherein the bumper is a separate component from the skid plate assembly.

11. The vehicle of claim 1, wherein the skid plate assembly is integral with the bumper.

12. The vehicle of claim 1, wherein the frame brackets are integral with the bumper.

13. The vehicle of claim 1, wherein a second angle between the first portion and the second portion of the main body is at least 120 degrees.

14. The vehicle of claim 1, wherein an orientation of the light source is adjustable with respect to the main body.

15. The vehicle of claim 1, wherein the first angle is adjustable.

16. A vehicle comprising:
   a bumper;
   a plurality of frame brackets;
   a skid plate assembly coupled to the frame brackets, the skid plate assembly comprising:
      a main body having a first portion, a second portion, a front surface, a rear surface, and a plurality of mounts;
      a light source having a first end, a second end, and a face through which light is directed;
   wherein the skid plate assembly extends below the bumper;
   wherein the front surface of the main body defines an opening that exposes the light source; and
   wherein when the vehicle is on a horizontal surface, the face of the light source is aimed forward and downward at a first angle of 60 degrees or less from horizontal; and
   wherein the mounts comprise at least one of:
      (1) a first arm and a second arm configured to attach to a first and second lateral side of the frame brackets; and
      (2) a first support and a second support extending rearward from the rear surface of the main body and configured to attach to a first and second front surface of the frame brackets.

17. The vehicle of claim 16, wherein the face of the light source is recessed from the front surface of the second portion.

18. The vehicle of claim 16, further comprising a power assembly and a wiring harness.

19. The vehicle of claim 16, wherein the first angle of the light source is between 15 and 60 degrees relative to horizontal.

20. The vehicle of claim 16, wherein an orientation of the light source is adjustable with respect to the main body.

* * * * *